D. G. GOLDING.
LENS MOUNTING FOR EYEGLASSES.
APPLICATION FILED MAR. 6, 1916.
1,274,870.
Patented Aug. 6, 1918.
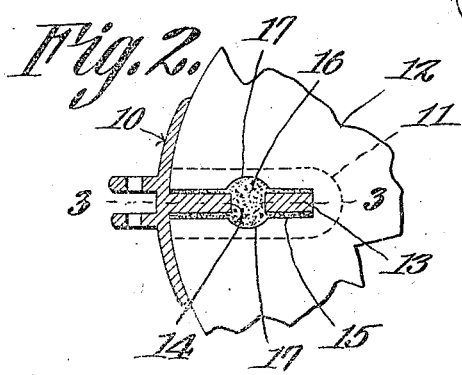
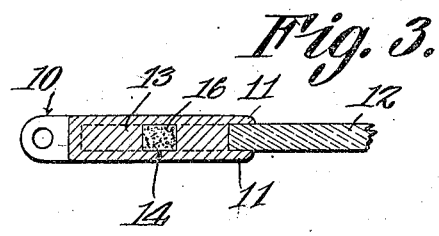
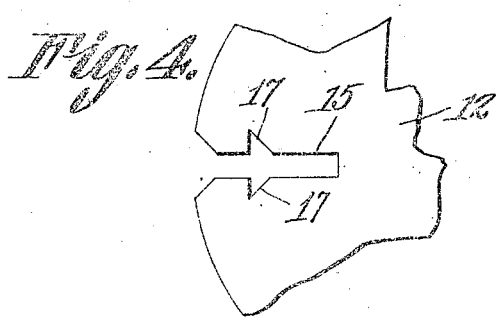
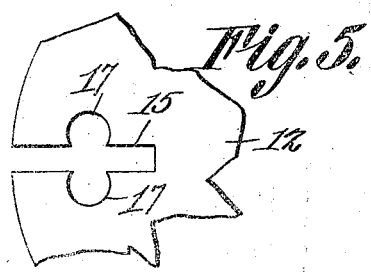
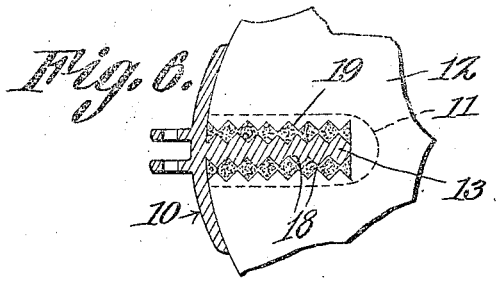
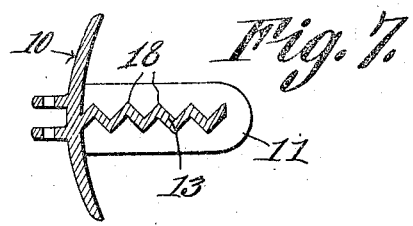
D. G. Golding
Inventor,
By Milo B. Stevens & Co.
Attorneys

UNITED STATES PATENT OFFICE.

DANIEL G. GOLDING, OF FREMONT, NEBRASKA.

LENS-MOUNTING FOR EYEGLASSES.

1,274,870.   Specification of Letters Patent.   Patented Aug. 6, 1918.

Application filed March 6, 1916. Serial No. 82,430.

*To all whom it may concern:*

Be it known that I, DANIEL G. GOLDING, a citizen of the United States, residing at Fremont, in the county of Dodge and State of Nebraska, have invented new and useful Improvements in Lens-Mountings for Eyeglasses, of which the following is a specification.

This invention relates to eyeglasses, and more particularly the gripping devices or mounts of the lenses, its object being to provide a novel and improved lens mount which is applied without screws or similar fastening devices, and which will securely hold the lens and effectually prevent the same from becoming loose.

The invention also has for its object to provide a device of the kind stated which is simple and cheap, and which can be easily applied without danger of injury to the lens.

With the objects stated in view, the invention consists in a combination and arrangement of parts to be hereinafter described and claimed and in order that the same may be better understood, reference is had to the accompanying drawing forming a part of this specification.

In the drawing, Figure 1 is a perspective view of the device;

Fig. 2 is a sectional detail illustrating its application;

Fig. 3 is a cross section on the line 3—3 of Fig. 2;

Figs. 4 and 5 are plan views showing fragments of the lens; and

Figs. 6 and 7 are sectional details showing modifications of the invention.

Referring specifically to the drawing, 10 denotes a lens mount having the usual laterally spaced straps 11 between which the lens 12 fits. Between the straps is a web 13 which forms a key for anchoring the mount to the lens. The web has a recess formed by an aperture 14 extending entirely through the web. One or more recesses may be provided.

In applying the mount 10 to the lens 12, a slot 15 is made in the edge of the latter of sufficient width to accommodate the web 13 and to leave some space for a filling 16 of cement. In line with the aperture 14, the walls of the slot 15 have notches or recesses 17 which latter, as well as the aperture, also receive the cement filling.

To provide the slot 15 and the notches 17 a hole may be drilled in the lens a short distance from the edge thereof, and the slot then cut so as to intersect the hole, as shown in Fig. 2; or the slot may first be made, and the notches filed out, as shown in Fig. 4. To obtain a wide slot, two holes, close together, may be drilled in the lens, and the slot cut to extend therebetween, as shown in Fig. 5. Various other methods will suggest themselves to those skilled in the art to which the invention appertains. After the slot and notches are made, and filled with some suitable cement, the mount is applied, the web 13 being inserted into the slot. The cement fills the aperture 14 and the notches 17 opposite the ends thereof, and also the space between the sides of the web and the walls of the slot, and when this filler hardens, the mount is securely and permanently anchored to the lens, and there is no danger of the parts getting loose. It will be noted that the thickness of the web is less than the width of the straps 11, which leaves portions of the latter in contact with the lens surfaces adjacent to the slot.

Figs. 6 and 7 show slight modifications in the web 13, the same not being apertured to produce a recess, but made corrugated transversely as indicated at 18. The corrugations on one side of the web may be alined with the corrugations on the other side as shown in Fig. 6; or they may be staggered as shown in Fig. 7. The walls of the slot are also corrugated, as indicated at 19, and the web is spaced therefrom to obtain spaces for the cement, the latter filling the corrugations and thus securely anchoring the web.

Both forms of the invention are simple and easily applied, and provide a strong and secure mount for the lens. Various other expedients may be employed for forming the anchoring recesses in the web 13, as by depressions, ridges, elevations, etc., and the corrugations may run both ways and also diagonally. The lens slot may also be threaded.

I claim:—

The combination with a lens having an edge slot the opposite walls of which are corrugated; of a mount having laterally spaced straps between which the slotted edge portion of the lens fits, and a web on the mount located between the straps and seating in the lens slot and secured therein by a cement filler, said web being corrugated transversely to produce anchoring recesses which are opposite the corrugations of the slot walls and spaced therefrom, said recesses and corrugations receiving the filler.

In testimony whereof I affix my signature.

DANIEL G. GOLDING.